No. 808,183. PATENTED DEC. 26, 1905.
T. ALEXANDER.
CABLE HAULAGE AND CARRIER TRANSFER.
APPLICATION FILED MAR. 28, 1905.
3 SHEETS—SHEET 3.
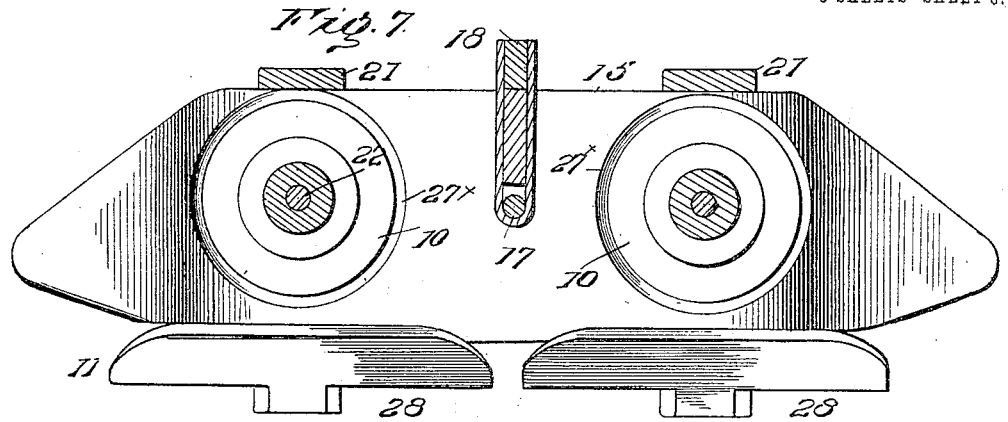
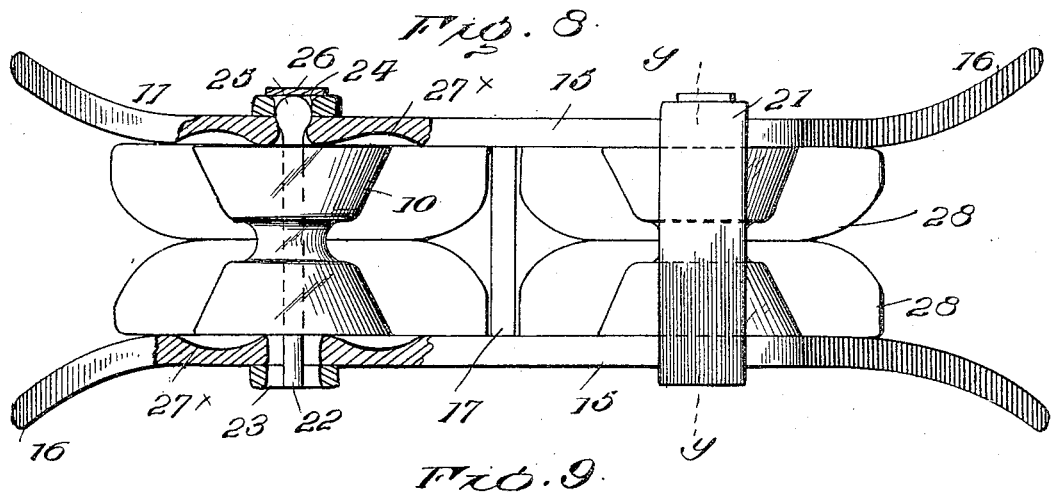
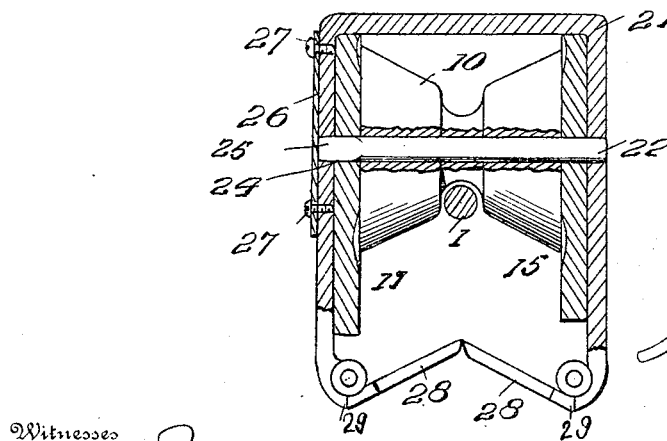
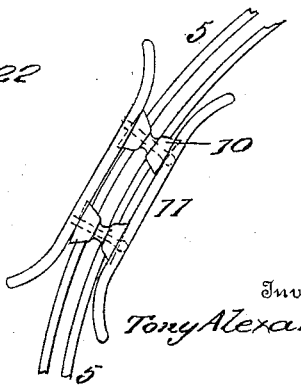
Inventor
Tony Alexander
Witnesses
By
R. S. & A. B. Lacey, Attorneys

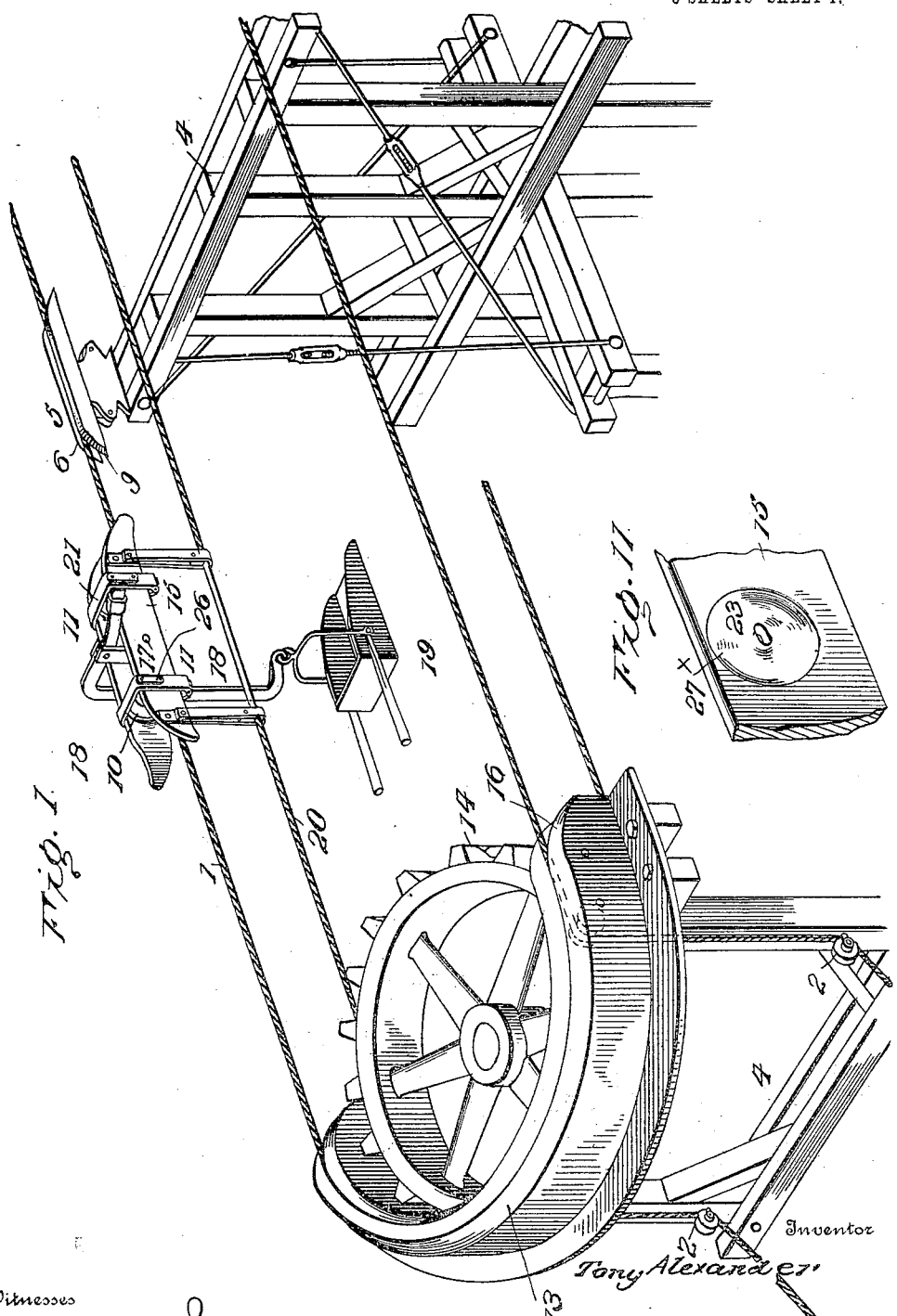

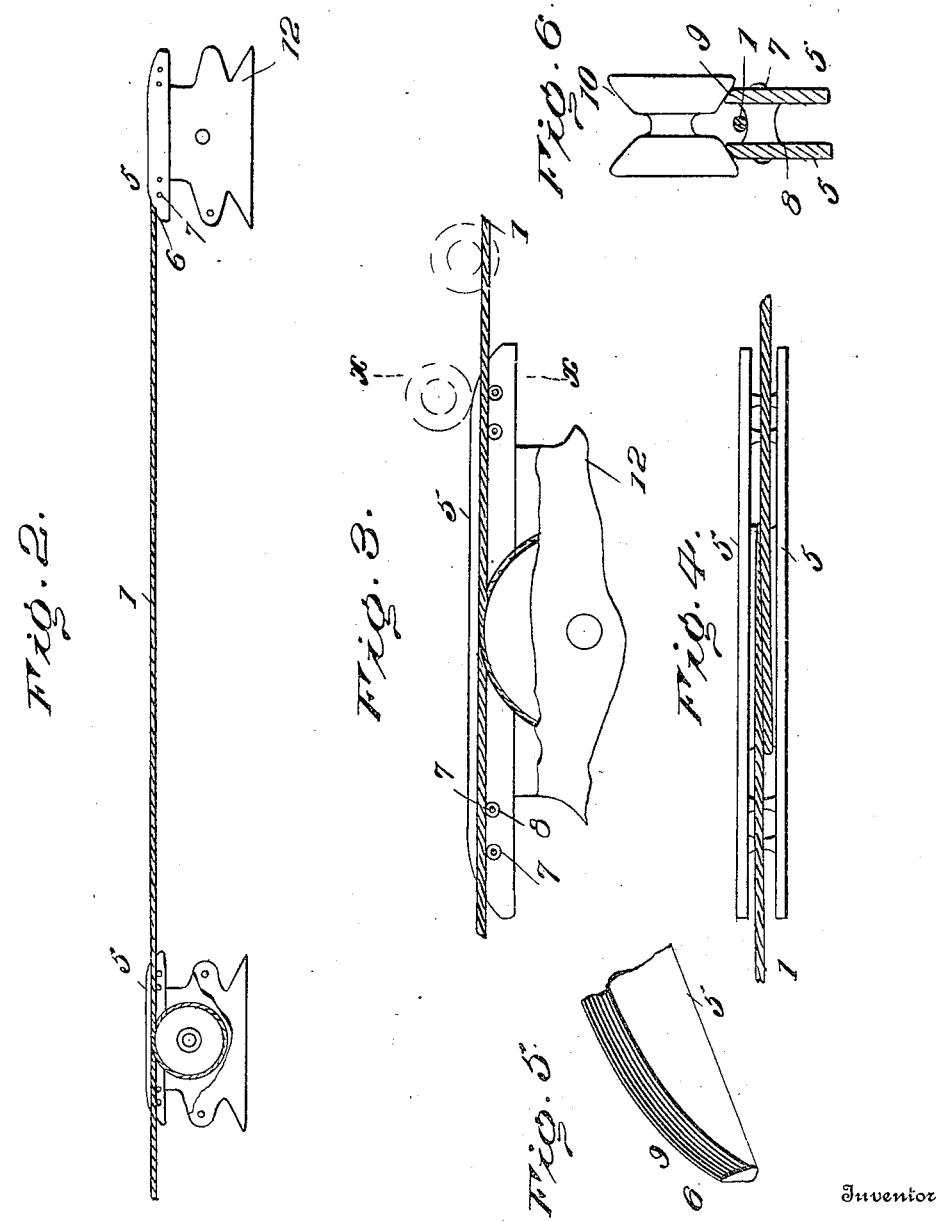

UNITED STATES PATENT OFFICE.

TONY ALEXANDER, OF BROOKHAVEN, MISSISSIPPI.

CABLE HAULAGE AND CARRIER-TRANSFER.

No. 808,183.  Specification of Letters Patent.  Patented Dec. 26, 1905.

Application filed March 28, 1905. Serial No. 252,564.

*To all whom it may concern:*

Be it known that I, TONY ALEXANDER, a citizen of the United States, residing at Brookhaven, in the county of Lincoln and State of Mississippi, have invented certain new and useful Improvements in Cable Haulages and Carrier-Transfers, of which the following is a specification.

This invention relates most especially to overhead system of cable haulage for transferring a load from one place to another, such as involved in making cuts or roads or in constructing railways through lowlands or swamps.

In a system of the character described the supporting track or cable is sustained at intervals in its length, and the traveling carriers must of necessity be transferred by such supporting-points with safety and without appreciable shock or jerk upon the coöperating parts, which in a comparatively short time would disable the apparatus and necessitate considerable cost in repairs. This invention provides a novel mechanism for transferring the carrier past the cable or track supports. The load-carriers are compelled to make short turns either for returning or for passing in a different direction, according to the nature of the work, and in order to obviate the strain and wear upon the cable, track, and carrier it is proposed to construct the latter to admit of its trolley-wheels shifting, so as to automatically adapt themselves to any change in the direction of strain due to deflection of the supporting track or cable.

With the aforementioned ends in view and such others as appertain to the nature of the invention the latter consists of the novel features, details of construction, and combination of parts, which hereinafter will be more particularly set forth, illustrated, and finally claimed.

In the accompanying drawings, forming a part of the specification, Figure 1 is a perspective view of an end portion of an overhead carrier system embodying the invention. Fig. 2 is a side view of a portion thereof. Fig. 3 is a longitudinal section of the upper portion of a transfer. Fig. 4 is a top plan view of the transfer. Fig. 5 is a detail perspective view of an end portion of a transfer-rail. Fig. 6 is a cross-section on the line $x$ $x$ of Fig. 3. Fig. 7 is a longitudinal section of a carrier. Fig. 8 is a top plan view of the carrier, an end portion being broken away to show more clearly the manner of mounting the axle of the trolley-wheel. Fig. 9 is a cross-section on the line $y$ $y$ of Fig. 8. Fig. 10 is a plan view of a carrier and a curved transfer or track. Fig. 11 is a detail perspective view of a portion of one of the side plates of the carrier, showing the depression to admit of movement of the axle and trolley-wheel when the carrier is traveling upon a curved transfer or track.

Corresponding and like parts are referred to in the following description and indicated in all the views of the drawings by the same reference characters.

The overhead track 1 may be of any formation, and preferably consists of a cable drawn taut over suitable supports and anchored at its ends in any substantial way. As shown in Fig. 1, an end portion of the cable 1 passes over the terminal support, thence downward along the same and around a pulley 2 at or near the foot of the support, and thence outward and anchored to the ground, as shown at 3, by means of a pin or in any determinate way. The cable or track 1 is supported at proper intervals in its length, the distances apart of the supports being determined by the load or character of work. The supports 4 may be of any construction and as illustrated consist of a framework comprising vertical posts, cross-beams, and braces. A transfer is located at each support to insure the safe movement of the carrier thereby.

The transfer, aside from its supporting means, consists of companion rails 5, which have their opposite ends beveled outward and forward, as shown at 6, whereby provision is had for entrance of the carrier upon the transfer and exit therefrom without producing any shock or jar. The rails 5 are disposed in parallel relation and arranged upon opposite sides of the cable or track 1 with their upper edges in a higher plane. The companion rails 5 are connected by means of pins or bolts 7, upon which are mounted spaces 8, consisting of spools concaved in their peripheries to centralize the cable, as shown most clearly in Fig. 6. The upper edges of the rails 5 are outwardly and downwardly beveled, as shown at 9, to centralize the trolley-wheels 10 of the carrier 11. The transfer is attached to each support by means of a framework 12, which may be of any suitable formation.

The transfer 13 (shown in Fig. 1) is arranged at one end of the haulage-cable and is curved to correspond to the cable-driver 14, so as to give proper direction to the carrier when making the turn preliminary to the return trip upon the companion track. The transfer 13 in all essential particulars is substantially the same as any of the intermediate transfers with the exception of its curvature made necessary to conform to the haulage-cable or interference of the cable-driver 14, so as to support the carrier in its travel therearound.

The carrier consists of similar side plates 15, having a parallel arrangement and suitably connected, corresponding end portions of the plates being flared, as shown at 16. A rod or bar 17 is supported at its ends in the plates 15, midway of their ends, and an arm 18, supporting the shovel or scoop 19, is connected thereto, said arm being likewise attached to the haulage-cable 20, which passes around the driver or supporting-pulley 14. A frame 21 of approximately ⊓ form embraces opposite end portions of the plates 15 and has its vertical or parallel members attached thereto. These frames are of substantial and rigid formation, so as to form a firm connection for the plates 15. An axle or pin 22 is loosely supported at its ends in end portions of the plates 15 and receives a trolley-wheel 10, which has its middle portion grooved to travel upon the cable or track 1 and its side portions beveled to run upon the beveled edges 9 of the transfer-rails. The pin or axle 22 may be supported in any manner so as to move and admit of the trolley-wheels adapting themselves to any curvature or deflection in the track. An elongated opening 23 is provided in one of the side plates 15 for the end of the pin or axle 22 to have a longitudinal play, and a corresponding opening 24 is provided in the opposite side plate 15 to receive the flattened head 25 of the pin or axle, opposite edge portions of the head 25 being rounded, so as to have a turning movement in the opening 24. The head 25 and opening 24 are of such a size as to prevent the pin or axle 22 from passing through the plate 15 having the opening 24, said pin being held in place by means of a plate 26 covering the opening 24 and secured by fastenings 27 to the part in which said opening 24 is formed. The openings 23 and 24 are formed in the parallel members of the frames 21, as well as in the side plates 15, as shown most clearly in Fig. 8, thereby providing an extended bearing for the terminal portions of the pin or axle. When the carrier is making a curve, the pins or axles 22 change their relation and the trolley-wheels correspondingly move, and in order to obviate binding between the ends of the trolley-wheels and the plates 15 the latter are cut away upon their inner sides, as shown at 27, the cut-away portions 27 being deeper at their outer ends to admit of ample play of the trolley-wheels when making a curve and at the same time providing sufficient metal at a central point adjacent to the axle to bear against the ends of the trolley-wheels and prevent endwise play thereof. Rock-plates 28 close the entrance to the frame of the carrier and serve to retain the carrier upon the track or cable 1. These lock-plates are hinged or pivoted at their lower ends and are adapted to swing upward at their inner ends against the sides of the plates 15, as shown most clearly by the dotted lines in Fig. 9, so as to admit of the carrier being removed from the track or placed in position thereon when required. The lock-plates 28 incline upwardly and inwardly and abut at their inner upper ends, so as to mutually support each other and prevent the carrier leaving the track even though it should receive a severe upward movement from any cause. Each lock-plate is limited in its downward movement by means of a butt-joint 29 or other suitable stop. The lock-plates are preferably hinged to the lower ends of the frames 21, although it is contemplated to pivotally attach them to any convenient part of the carrier so long as they serve to accomplish the desired end.

In accordance with this invention the carrier is lifted from the track when passing by a support thereof and is delivered upon said track without imparting any perceptible jar or jolt or strain upon the mechanism, and when passing around a curve the trolley-wheels automatically adapt themselves to the curvature, thereby obviating strain and wear, such as would result if the axes of the trolley-wheels would remain parallel and not give. It frequently happens that the carrier receives an upward thrust, due to a jar or other cause, and the provision of the lock-plates prevents the carrier leaving the track under such conditions. By having the trolley-wheels mounted so as to give the framework of the carrier may be reached and the arm 18 connected thereto in any substantial manner. The lock-plates also serve to hold the carrier on the transfer when passing thereover, since they pass beneath the transfer-rails.

Having thus described the invention, what is claimed as new is—

1. In a carrier system and in combination with a carrier, actuating means therefor, and a supporting-track, a transfer for sustaining the carrier in its travel by a track-support, said transfer comprising companion rails arranged upon opposite sides of the track and having its end portions beveled to gradually lift the carrier from the track and permit of its gradual return thereto.

2. In a carrier system and in combination with a carrier, actuating means therefor, and a supporting-track, a transfer for sustaining the carrier in its travel by a track-support, said transfer comprising companion rails arranged upon opposite sides of the track and having its edges beveled and its end portions correspondingly beveled outward and downward, the parts being disposed to centralize the carrier and to gradually lift the same from the track and gradually return it again thereto.

3. A carrier comprising oppositely-disposed side plates rigidly connected, and trolley-wheels mounted in said side plates and adapted to have a limited horizontal movement to automatically shift to accommodate themselves to a deflection in the track upon which the carrier is mounted to obviate any binding or abnormal wear.

4. A carrier comprising a rigid frame having longitudinal spaced cut-away portions upon its inner faces, and trolley-wheels mounted in said frame between the spaced cut-away portions and adapted to yield horizontally to automatically conform to any deflection or curvature in the track upon which the carrier may be mounted.

5. A carrier comprising side plates rigidly connected and having longitudinally-elongated openings, a pin or axle fitted in corresponding openings and adapted to have a limited play therein, and trolley-wheels mounted upon said pins or axles.

6. A carrier comprising oppositely-disposed side plates provided with longitudinally-elongated openings, a pin or axle supported in corresponding openings, trolley-wheels mounted upon said pins, and means for covering one of said openings to retain the pins in place.

7. In combination with a carrier comprising oppositely-disposed members and an interposed trolley-wheel, and swinging lock-plate for closing the entrance to the carrier to prevent it from leaving the track when receiving a displacing impulse.

8. A carrier comprising oppositely-disposed members and an interposed trolley-wheel, in combination with companion lock-plates pivoted or hingedly connected at their outer ends to the side members of the carrier and inwardly and upwardly inclined and adapted to swing upward against said side members.

9. A carrier comprising oppositely-disposed side plates having transversely-alined openings and cut away upon their inner sides at each side of said openings, and a trolley-wheel mounted between said side plates and having the end portions of its axial support fitted into the transversely-alined openings of the side plates and adapted to have the ends of the trolley-wheel enter the cut-away portions of said side plates when the carrier is adapting itself to a curve or deflection in the supporting-track.

10. A carrier comprising side plates, ⌐⌐-shaped frames having the side plates attached to their parallel members, and trolley-wheels arranged between the side plates and having the terminal portions of their axle-supports let into the side plates and the parallel members of said ⌐⌐-shaped frames.

11. A carrier comprising plates, ⌐⌐-shaped frames having the side plates attached to their parallel members, trolley-wheels mounted upon axles supported in said side plates, and lock-plates hinged to the lower ends of the members of said ⌐⌐-shaped frames and adapted to open upward against the inner faces of said side plates.

In testimony whereof I affix my signature in presence of two witnesses.

TONY ALEXANDER. [L. S.]

Witnesses:
J. D. YOAKLEY,
V. B. HILLYARD.